(12) United States Patent
Rantala et al.

(10) Patent No.: US 7,122,109 B2
(45) Date of Patent: Oct. 17, 2006

(54) METHOD FOR THE IMPROVEMENTS OF CURRENT EFFICIENCY IN ELECTROLYSIS

(75) Inventors: Ari Rantala, Porvoo (FI); Henri Virtanen, Pori (FI)

(73) Assignee: Outokumpu Technology Oy, Espoo (FI)

( * ) Notice: Subject to any disclaimer, the term of this patent is extended or adjusted under 35 U.S.C. 154(b) by 496 days.

(21) Appl. No.: 10/481,522

(22) PCT Filed: Jun. 14, 2002

(86) PCT No.: PCT/FI02/00522

§ 371 (c)(1),
(2), (4) Date: Dec. 19, 2003

(87) PCT Pub. No.: WO03/000960

PCT Pub. Date: Jan. 3, 2003

(65) Prior Publication Data

US 2004/0232002 A1 Nov. 25, 2004

(30) Foreign Application Priority Data

Jun. 25, 2001 (FI) .................................. 20011351

(51) Int. Cl.
*C25B 15/02* (2006.01)
*C25B 15/06* (2006.01)

(52) U.S. Cl. ........................ 205/337; 205/335; 205/336

(58) Field of Classification Search ................ 205/335, 205/336, 337
See application file for complete search history.

(56) References Cited

U.S. PATENT DOCUMENTS

| | | | |
|---|---|---|---|
| 3,256,172 A | 6/1966 | Dörfel et al. | 204/228 |
| 3,574,073 A | 4/1971 | Ralston, Jr. | 204/99 |
| 3,793,166 A | 2/1974 | Shaw | 204/108 |
| 3,809,902 A | 5/1974 | Cofer et al. | 250/338 |
| 4,038,162 A | 7/1977 | Kapanen et al. | 204/105 R |
| 2001/0040401 A1* | 11/2001 | Lin | 297/397 |
| 2006/0065302 A1* | 3/2006 | Gibson et al. | 136/291 |

* cited by examiner

*Primary Examiner*—Bruce F. Bell
(74) *Attorney, Agent, or Firm*—Morgan & Finnegan, LLP

(57) ABSTRACT

The invention relates to a method for the improvement of current efficiency in electrolysis. According to the method, a theoretical cell voltage is first calculated, which is compared with the measured voltage. The cumulative difference between the theoretical and measured cell voltage is monitored constantly and when this difference is proportioned to the current efficiency, information on the status of the process can be obtained continually. A decrease in current efficiency is a clear indicator of short circuits between the electrodes, and by means of the method according to the invention, it is possible to concentrate the short circuit removal work onto the correct cell groups, from the point of view of the current efficiency of the electrolysis.

3 Claims, No Drawings

METHOD FOR THE IMPROVEMENTS OF CURRENT EFFICIENCY IN ELECTROLYSIS

The invention relates to a method for the improvement of current efficiency in electrolysis. According to the method, a theoretical cell voltage is first calculated, which is compared with the measured voltage. The cumulative difference between the theoretical and measured cell voltage is monitored constantly and when this difference is proportioned to current efficiency, information on the status of the process can be obtained continually. A decrease in current efficiency is a clear indicator of short circuits between the electrodes, and by means of the method according to the invention, it is possible to concentrate the short circuit removal work into the correct cell groups, from the point of view of the current efficiency of the electrolysis.

In the electrolytic treatment of metals, the desired metal is deposited onto the surface of the electrode, the cathode. The treatment is carried out with the aid of an electric current in electrolysis cells, where a row of plate-like anodes and plate-like cathodes of electro conductive material are immersed alternately into the liquid present, the electrolyte. The desired metal can be precipitated onto the cathode in the electrolytic treatment either by using soluble anodes of the same metal as that which is to be precipitated, or using insoluble anodes. Soluble anodes are used, for instance, in copper electrorefining and insoluble anodes are used, for example in the electrowinning of nickel or zinc.

In the electrolytic refining of copper, the impure so-called anode copper is dissolved by means of electric current and the dissolved copper is reduced onto the cathode plate as very pure, so-called cathode copper. A sulfuric acid-based copper sulfate solution is used as the electrolyte. A copper starting sheet or so-called permanent cathode, can be used as the cathode plate at the beginning of the process, said permanent cathode can be made of acid-resistant steel or titanium. One, or several, rectifiers are used as the current source in electrolysis. Current density of 250–320 $A/m^2$ is typically used, and the current is direct current (DC). Electrolysis takes place in separate electrolysis cells, where the number of anode-cathode pairs varies from plant to plant, being typically 30–60 pairs. There are varying numbers of electrolytic cells in the different plants. Anodes are typically dissolved for 14–21 days, whereas the cathode cycle is 7–10 days.

The production capacity of an electrolysis plant is dependent upon the current intensity, the number of electrolytic cells and upon the time and current efficiencies of the plant. The efficiencies describe how well temporally the cells in the plant are in use (current on) and how well the electric current is used for depositing the copper. The capacity of electrolysis plants is raised by increasing the current intensity applied, building more electrolytic cells or by improving the efficiencies.

Current efficiency is an essential parameter when examining the copper electrolysis process, its capacity and economic efficiency. The term tells the electric current proportion, which is applied for depositing copper onto the cathodes, compared with the theoretically calculated maximum amount of deposit with that current. In practice the short circuits occurring between the anodes and cathodes decrease the current efficiency most drastically. In a short circuit the electric current travels directly from one electrode to another without depositing copper from the electrolyte. The electric current thus goes to waste.

In the prior art, in U.S. Pat. No. 4,038,162 a method is described for the prevention and removal of short circuits and thereby for the increase of current efficiency. The method is based on measuring the total current, for example with the aid of a magnetic field, after which an automatic cathode-replacing device is directed into position, which device replaces the short-circuited cathode for a new one.

Several different factors of the electrolysis process affect the occurrence of short circuits, such as current distribution, impurities in the electrolyte and the anode properties. Disturbances occurring in the process can easily be seen as an increase in short circuits. The number of short circuits in the day-to-day electrolysis process can be considered a good indicator of the status of the process. At present, short circuits are observed and removed manually, which in practice means a tremendous amount of work every day.

According to this invention, a continuous method has been developed for the improvement of current efficiency, whereby the cell voltage of the electrolysis cell groups is measured continually, which cell voltage is compared to the calculatory cell voltage, and the cumulative difference in voltages is proportioned to the current efficiency in order to concentrate the short circuit removal work on the cell groups having the lowest current efficiency. Thus the method is based on the information from different measured data from the electrolysis process and on the utilization of this information. Upon implementation of the method, it is no longer necessary to manually go through each cell group separately, but work can be concentrated to the more critical cell groups and thus the current efficiency of the whole electrolysis plant can be increased. The essential features of the invention are presented in the enclosed claims.

In the method developed, the theoretical cell voltage is first calculated on the basis of the process measurements and variables. The process measurements used are temperature and composition of the electrolyte and used electric current. The variables are spacing between electrodes and number of cells between the cell voltage measuring points. When the theoretical cell voltage is compared to the measured voltage, it is possible to obtain information of the short circuit status of the cell group. In practice, it is worthwhile to measure cell voltage in electrolysis per half-group, as anodes are generally changed by half group and the cell voltage also varies accordingly. By "cell group" below is also meant half groups or other entity, where anodes are changed simultaneously. The greater the difference between measured and theoretical cell group voltage, the higher the number of short circuits in the group. Thus it is possible to obtain valuable additional information on the status of the cell groups for both process control and for the control of short circuit removal work. When the work is concentrated to the critical cell groups, no damage is caused with needless inspection rounds of the cell groups that are running well. The general view of the short circuit status is also clearer than before.

For current efficiency forecasting purposes, a model is used which is composed of several cathode cycle series. From the series of measurement, for each cathode cycle a theoretical and measured cell voltage cumulative difference is calculated, which is proportioned to the current efficiency obtained. The results of tests performed have shown that the dependency between the cumulative difference and the current efficiency achieved is quite linear. It has been observed that in practice the method forecasts the current efficiency to be achieved to an accuracy of ±1%.

In practice, therefore, the cell voltage is measured as on-line type, in other words continuously in cell groups. From the difference between the theoretical and calculated cell voltage it is possible to deduce the current efficiency of the group or half group in question. Short circuits of the cell groups having the lowest current efficiency are worked out first. Thus it is possible to avoid disturbances to a well running group and to concentrate only on the groups requiring immediate attention. By means of the method, it is possible to improve the current efficiency of the entire electrolysis plant compared to the traditional manual operation. Additionally, savings are made in labor costs.

The invention claimed is:

1. A method for the improvement of current efficiency in an electrolysis, comprising continually comparing with the aid of measured variables from the electrolysis process, a calculated theoretical cell voltage of the electrolytic cells with measured real cell voltage, and proportioning the cumulative difference in voltages to the current efficiency in order to concentrate short circuit removal work in cell groups with the lowest current efficiency.

2. A method according to claim 1, wherein the temperature and composition of the electrolyte, spacing between electrodes, number of cells and electric current are the variables used for the calculation of the theoretical cell voltage.

3. A method according to claim 1, wherein there is a linear connection between the cumulative difference in the theoretical and measured cell voltage and the current efficiency achieved.

* * * * *